July 8, 1952
J. M. GAROUTTE
2,602,707
DEVICE FOR HANDLING MATERIALS
Filed March 2, 1950
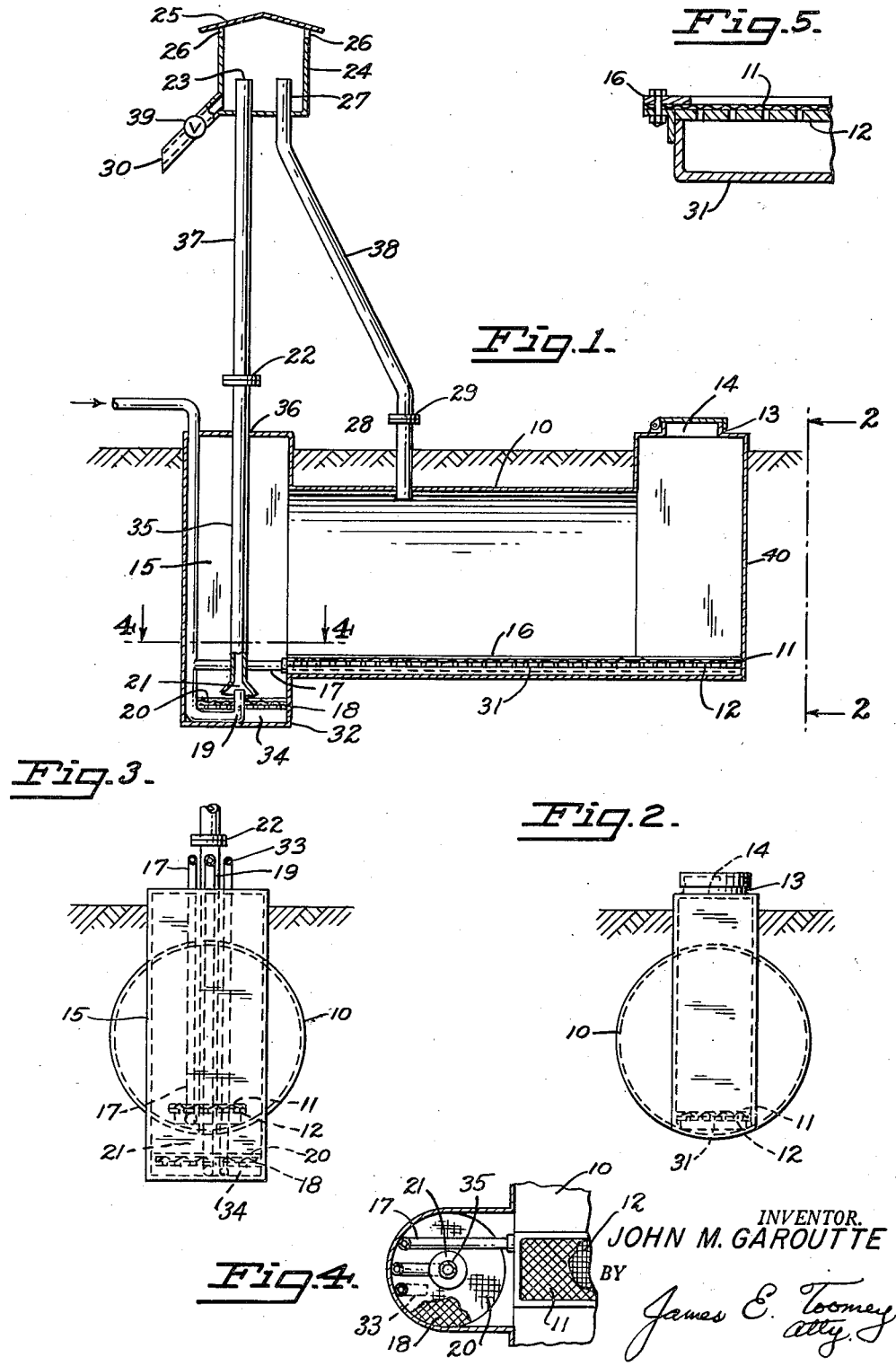
INVENTOR.
JOHN M. GAROUTTE
BY
James E. Toomey
atty.

Patented July 8, 1952

2,602,707

UNITED STATES PATENT OFFICE 2,602,707

DEVICE FOR HANDLING MATERIALS

John M. Garoutte, Palo Alto, Calif., assignor to Permanente Cement Company, Oakland, Calif., a corporation of California Application March 2, 1950, Serial No. 147,198

2 Claims. (Cl. 302—53)

This invention relates to an apparatus for storage and delivery of finely divided solid material; and it relates more particularly to an apparatus whereby finely divided solids are distributed and delivered by means of a flow of air or other gas, in an efficient and economical manner; and it relates to an improved method of storing and delivering such solids.

The handling, packing, shipping and storage of finely divided solids, such as cereals, grains, cements, lime, etc. have in the past required quite expensive installations where the operations were mechanically performed. In transferring such materials to or from silos, tankers, trucks, cars, etc., unless so situated that the transfer can be accomplished by gravity, it has been the practice to employ screw conveyors, where suitable, or to employ air under relatively high pressures, e. g. 35 pounds per square inch, with attendant motors, blowers or other necessary equipment. Because of the expense involved in these mechanical operations, it has been necessary in many cases to handle such materials in packages of sizes suitable for manipulation by one or two men, for example, in bags or barrels, with the obvious results of slower transfer, hazards to health from the fine dusts which disperse into the air, and the losses of products which also occur thereby.

It is an object of this invention to provide a device and method for storage and delivery of finely divided solid material and dusts. It is a further object to provide an economical device for mechanically handling smaller quantities of finely divided solids. It is a more specific object to provide a more inexpensive device for storage and for delivery to a mixing apparatus, or mixing zone, of relatively smaller quantities of cement, such as Portland cement, with a minimum of manual labor and with minimum dust hazard.

Figure 1 is a sectional view of one embodiment of the present invention; Figure 2 is a view of the same embodiment looking toward the intake end and feed well; Figure 3 is an end view looking toward the take-off well; Figure 4 is a view along line 4—4 of Figure 1; and Figure 5 shows the construction of one embodiment of an air pad.

According to this invention and referring to Figure 1, there is provided a closed main container vessel or receptacle indicated generally at 10 which is shown in the sketch as being cylindrical as to the main body portion, but may be rectangular, elliptical, or of any other desired cross-section and is elongated along a generally horizontal axis. In this embodiment a feed well 40 is disposed at one end of container 10. The embodiment shown is made of metal, and the construction is welded, but the receptacle or container can be made of any other desired material which is suitably impervious to gases. An aperture is provided at one end of the container vessel, indicated at 14, through which finely divided solids are fed to the container. Solids can be fed in at another part of the container as desired. For instance, solids can be fed in at the center and taken off at both ends, by means of duplicate take-off assemblies; or can be taken off by a centrally located assembly and fed in at the ends. A suitable cover 13 is provided for the feed aperture 14 and may, if desired, be attached thereto by means of hinges or in any other suitable manner. Disposed longitudinally in the base of the container, preferably centrally along its length, is an air pad which, in the embodiment shown, comprises a canvas 11 supported by a grating 12, the whole assembly being suitably supported over and attached to air trough 31, preferably of metal, which is fed by air pipe 17, attached to a manifold or to a pump or compressor (not shown). At the opposite end of the container from the intake aperture 14, in this embodiment, is disposed a take-off well assembly comprising a depressed portion 32 at the base of which is disposed a second air pad consisting of a canvas 20 disposed on a grating 18 which is suitably supported on and attached to air trough, or shallow air-conducting device 34, also preferably of metal, into which air is introduced by pipe 33. Extending vertically from a short distance above this air pad, that is, from adjacent the upper surface thereof, is conduit or pipe 35 having enlarged or bell-shaped lower opening 21. Air pipe 19 passes upwardly through the central portion of grating 18 and canvas 20 and terminates within bell 21 and conduit 35. Conduit 35 passes upwardly through aperture 36 in the upper portion of take-off well 15 and is connected by means of flange 22 to pipe 37 which extends upwardly into a constant head box 24, the outlet 23 of conduit 37 being disposed above the base of constant head box 24. Constant head box 24 is disposed at a distance above the receptacle and take-off well, and maintained in that relative position by suitable supports (not shown), to permit gravity feed of the contents of the box. Constant head box 24 is rectangular in shape in the embodiment shown and is likewise made of metal, but other materials of construction and boxes of any other desired shape can be used. Box 24 is provided with a top, or cover, 25 and with suitable air vents for the system shown at 26. Also disposed within box 24 is the upper portion 27 of return pipe 38. Pipe 38 is connected by flange 29 to pipe or conduit 28 which extends into the upper part of the main portion of container 10. At the base of constant head box 24 is disposed take-off conduit 30 with suitable valve 39 for controlling the flow of materials from the box.

Figure 2 is the end view of the device of Figure 1, on line 2—2'. The principal receptacle or container is indicated at 10, and this view shows particularly the disposition and construction of the air pad assembly including canvas 11, grating 12, and air trough 31, disposed in the lower central portion of the main body of the container.

Figure 3 is an end view of the embodiment of Figure 1 looking toward the take-off well. In this view, 17, 19, and 33 are conduits for introduction of air to the air-pad assemblies and the take-off conduit 35. The discharge pipe is indicated at 35 with bell-shaped mouth 21.

Figure 4, on line 4—4', of Figure 1, shows a plan view of the take-off well air pad assembly 41 and of the main, or principal, container air pad assembly 42. In this view, 17, 19, and 33 are air conduits. The canvas of the air pad in the take-off well or chamber is indicated at 20 and its supporting grating at 18. The take-off pipe is indicated at 35 and its bell-shaped mouth at 21.

Figure 5 shows the detail of construction of one embodiment of an air pad comprising an air trough or conduit 31, grating 12 disposed at the top of trough 31, and canvas 11 disposed over the grating and held in place by metal plate 16 and suitable bolts. If desired, the gratting and canvas can be replaced by porous ceramic or other material.

This invention will be illustrated by its application in the handling or storage of cement. In this embodiment the main portion of the assembly is embedded in the earth with the parts shown as extending above ground. In this embodiment, a hopper-bottomed, or other, truck can be driven into a position over aperture 14 and, with cover 13 removed or open, a load of cement can be discharged into the container 10. Air, at about 2–5 pounds, preferably about 3 pounds, pressure, is introduced through pipe 17 into trough 31 and functions to level off the load of cement in the container and aids in conducting it toward take-off well 15. Container 10 is shown as disposed generally horizontally, but it is preferable to incline it slightly downwardly toward the take-off well to assist in propelling the cement into the well as needed. Air, under similar pressure as in pipe 17, is introduced through pipe 33 into air space 34 in the second air pad assembly 41 at the base of well 15 and functions to keep a portion of the cement which flows into well 15, especially in the depressed portion 32 thereof, in a fluidized state. Air under similar pressure flows through pipe 19, debouches into bell mouth 21 and passes upwardly through take-off pipe 35, carrying with it fluidized cement dust from adjacent air pad assembly 41. The current of air and fluidized cement dust passes upwardly into constant head box 24 and deposits therein to the depth of the upper end of take-off pipe 27. Cement, as desired, is drawn off by gravity through conduit 30 when valve 39 is opened. This dust can be drawn off into a weigh-batcher in the amounts desired or, after suitable observation or calibration, can merely be allowed to flow for the desired length of time after which valve 39 is closed and the box 24 refilled to the desired depth. Excess cement dust in box 24 falls through pipe 38 and is returned to the main portion of container 10 where it is again available for use. Vents 26 which are shown in the drawing as in constant head box 24 can alternatively be provided at the upper portion of container 10 or at any other desired and suitable place in the system. They serve to prevent building up of pressure within the system to an undesirable value. More than one take-off valve can be provided in constant head box 24 and, for example, cement can be taken off alternatively to two mixers.

Although in the present embodiment the container and take-off assembly are shown as embedded in the earth, a container and take-off assembly of suitably strong construction can be mounted upon a truck, filled at a central source of supply or at a central plant, transported to the site of use, and suitable pipes leading to a constant head box and to a source, or sources, of air supply can there be attached. It is a particular advantage of the present structure that it can be embedded in the earth and installed at low cost, for example, in a relatively shallow trough or ditch, covered or not, as desired. Thus it is economical for use by plants, or in locations, where relatively small amounts of product are to be handled. It is of further advantage that the product to be handled can be fed into the container by direct discharge, for instance, by gravity, from a truck or other device. The constant head box, being disposed above and spaced apart from the container and take-off assembly, is adapted to feed product by gravity to the site of use, avoiding the necessity for any power-operated delivery device.

Whereas, in the above detailed description and in the sketches, the receptacle for the finely divided solids is shown as cylindrical, it can alternatively be rectangular or any other desired shape. There are, however, advantages in employing a receptacle which is horizontally elongated and of cylindrical form. The efficiency of the air pad is greater and there is less "dead" space where the walls of the receptacle curve or slope upwardly from adjacent the air pad.

The take-off well can be disposed at the level of the lower end of the base of the principal portion of the receptacle. However, it is advantageous to depress the base of the take-off chamber below the level of the base of the receptacle, because this maintains a more satisfactory head of fluidized solids as the loading of the container decreases. Where the base of the take-off chamber is coextensive with, or approximately a continuation of, the base of the principal receptacle, the air pad serving to fluidize the solids in the take-off chamber or zone, can be an extension, enlarged in area, if desired, of the air pad of the principal portion of the receptacle. Where the level of the take-off chamber is depressed, as shown in the above description, the air pad therein is advantageously independent of the air pad in the principal chamber, and suitably conforms to the cross-section of the base of the take-off chamber; but it could also be a depressed extension of the air pad in the principal chamber. If desired, the air trough or air-conducting element can be a suitably recessed portion of the base of the receptacle or of the take-off well or chamber, the pervious member then being disposed in the top of such recessed portion.

The device of this invention is advantageous in that it is very economical to install and operate. The use of low air pressures in moving the solids results in significant saving in the cost of the blowers or compressors required. The device can be employed to serve quite small cement-mixer operations, and at lower costs for the total equipment, with reference both to first cost and to maintenance. There are no moving parts to be serviced, and the device can be employed in cooperation with transporting or mixing devices now in general use.

The invention comprises also a method of delivering finely divided solids, such as cements, cereal grains, starches, ores such as dolomite, magnesite and the like, lime, etc., by applying low air pressure, preferably less than five pounds, at the base of a load of such solids, in a receptacle or storage zone, to distribute the solids and partially fluidize them, at least to fluidize the lower portion or base of the load. The solids so treated are then conducted to a take-off zone, preferably partially by gravity, and are there entrained in or subjected to a stream of air under low pressure, preferably less than five pounds, to conduct them to a zone of approximately atmospheric pressure where the solids fall out of the air stream and are deposited. They can be drawn off from the deposition zone as desired. Air has been described herein as the gas of choice because of its ready availability and low cost.

In this specification and claims, the air or gas pressures recited are superatmospheric pressures. That is to say, a pressure of five pounds is to be understood to mean a pressure of five pounds per square inch above atmospheric pressure, or, in other words, five pounds per square inch gauge pressure.

What is claimed is:

1. An apparatus for storage and delivery of finely divided solids comprising a closed horizontally elongated storage receptacle having an intake aperture, a take-off chamber disposed adjacent said receptacle and in open communication therewith, an air-conducting trough disposed within the base of said receptacle, a gas-permeable member disposed at the top of said air-conducting trough, means disposed within and extending downwardly from the top of said chamber for admitting air to said air-conducting trough, an air-conducting device disposed at the base of said take-off chamber and below said first air-conducting means, a gas-permeable member disposed in the top of said air-conducting device, means disposed within and extending downwardly from the top of said chamber for admitting air to said air-conducting device, a take-off pipe extending upwardly from adjacent the surface of said gas-permeable member in said take-off chamber, a constant head chamber disposed above said take-off chamber and spaced apart therefrom, said take-off pipe terminating within said constant head chamber and above the base thereof, means disposed within and extending downwardly from the top of said take-off chamber to the base of said take-off chamber for introducing a stream of air upwardly through said take-off pipe, a conduit extending from said constant head chamber to said closed receptacle, said conduit terminating above the base of said constant head chamber and being adapted to return excess solids from said constant head chamber to said closed receptacle, and a take-off conduit disposed at the base of said constant head chamber and adapted to withdraw finely divided solids therefrom by gravity.

2. An apparatus for storage and delivery of finely divided solids comprising a horizontally disposed, closed cylindrical storage receptacle having an intake aperture at one end thereof, a take-off chamber disposed adjacent said cylindrical receptacle and in open communication therewith at the opposite end thereof from said intake aperture, an air-conducting trough disposed longitudinally within the base of said cylindrical receptacle, a grating disposed in the top of said trough, a canvas disposed at the top of said grating, the base of said take-off chamber being recessed below the base of said cylindrical container, a shallow air-conducting device disposed within said recessed base of said take-off chamber, a grating disposed in the top of said air-conducting device, a canvas disposed at the top of said grating, a take-off pipe extending vertically through said take-off chamber from adjacent said canvas, a pipe disposed within and extending downwardly from the top of said chamber to said recessed base for introducing a stream of air upwardly through said take-off pipe, a constant head chamber disposed above said take-off chamber and spaced apart therefrom, said take-off pipe terminating within said constant head chamber above the base thereof, a conduit extending from above the base of said constant head chamber to within said cylindrical receptacle and being adapted to return excess finely divided solids to said cylindrical receptacle, and pipes disposed within said take-off chamber and extending downwardly from the top thereof and adapted to supply air to said air-conducting trough and air-conducting device, and a take-off conduit disposed at the base of said constant head chamber and adapted to withdraw finely divided solids therefrom by gravity, and an air vent in said constant head chamber.

JOHN M. GAROUTTE.

REFERENCES CITED

The following references are of record in the file of this patent:

UNITED STATES PATENTS

| Number | Name | Date |
|---|---|---|
| 1,842,416 | Ludwig | Jan. 26, 1932 |
| 2,219,283 | Horn | Oct. 29, 1940 |
| 2,316,814 | Schemm | Apr. 20, 1943 |
| 2,509,984 | Morrow | May 30, 1950 |
| 2,527,455 | Schemm | Oct. 24, 1950 |
| 2,565,835 | Adams | Aug. 28, 1951 |